July 13, 1948.  S. M. HODGINS  2,445,268
FLOAT OR THE LIKE
Filed Oct. 30, 1942
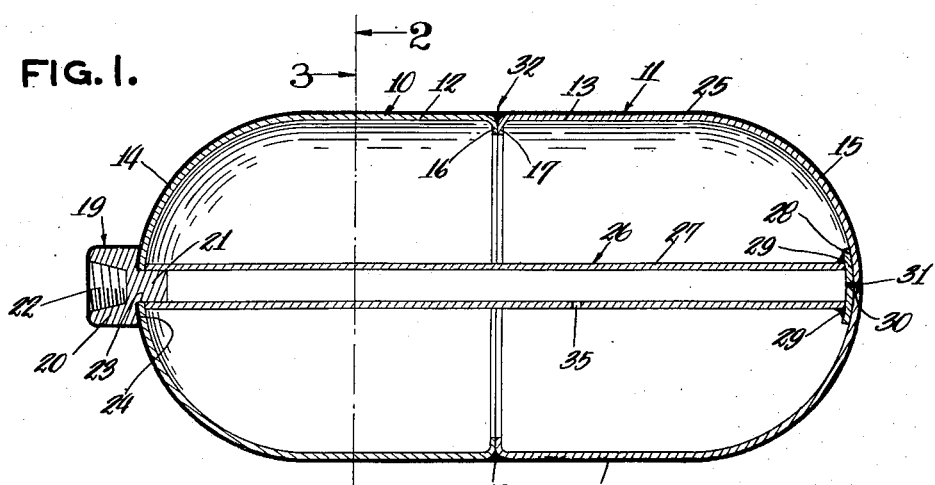
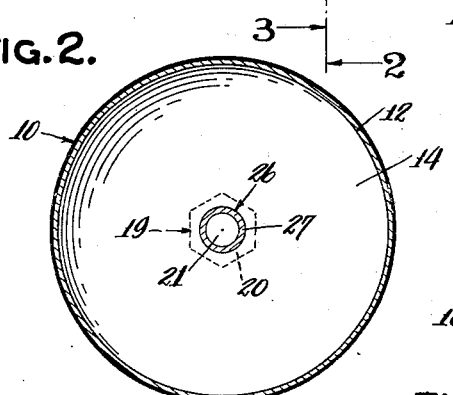
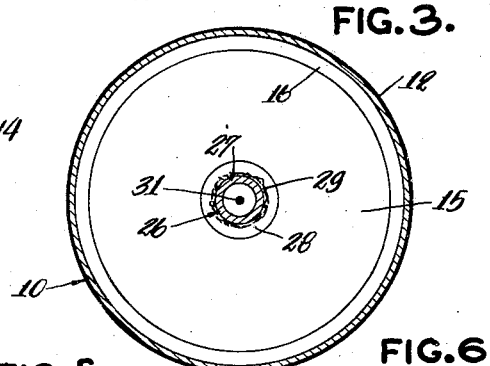
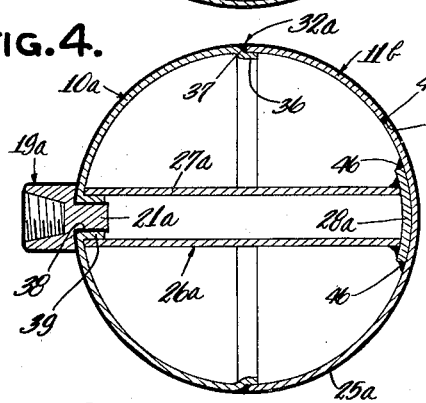
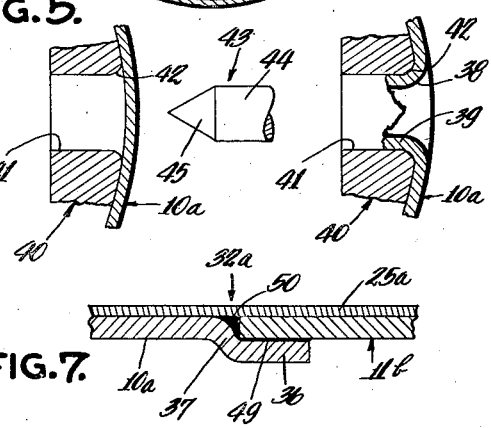
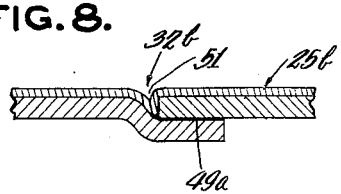
SYDNEY M. HODGINS
INVENTOR
BY Freeman, Sweet, Albrecht, and Williams
ATTORNEYS

UNITED STATES PATENT OFFICE 2,445,268

FLOAT OR THE LIKE

Sydney M. Hodgins, Lakewood, Ohio

Application October 30, 1942, Serial No. 463,868

4 Claims. (Cl. 137—104)

This invention relates to devices embodying sealed metallic shells and more particularly to floats and the like where these devices are to be used under relatively high temperature and high pressure conditions and where the devices are apt to be subjected to corrosive action, and the principal object of the invention is to provide new and improved devices of these types.

The novel features of the invention will appear from this specification and the accompanying drawing forming a part of this application and showing several embodiments of the invention for purposes of illustration, and all these novel features are intended to be pointed out in the claims. In the drawing:

Figure 1 is a central longitudinal sectional view of a float embodying the invention, Figure 2 is a section taken on the line 2—2, looking in the direction of the arrows, Figure 3 is a section taken on the line 3—3, looking in the direction of the arrows, Figure 4 is a central section of another float embodying the invention, Figure 5 is an enlarged fragmentary view partly in section, and Figure 6 is an enlarged fragmentary sectional view, illustrating a method of providing a flanged aperture in a shell part, and Figures 7 and 8 are enlarged fragmentary sectional views showing different forms of joints between shell parts.

Referring to the embodiment shown in Figures 1, 2, and 3, the float there illustrated has a generally cylindrical portion and hemispherical ends and comprises two shell parts 10, 11, which may be of any suitable steel, preferably but not necessarily, .10 percent to .20 percent carbon, having cylindrical portions 12, 13, and hemispherical ends 14, 15.

The adjacent ends of the cylindrical portions 12, 13 of the shell parts are here shown as provided with inwardly directed annular flanges 16, 17 of desired radial width, these flanges being in abutting engagement and united as by sweat brazing to form a joint 32, additional brazing material 18 being desirably but not necessarily added to fill in the seam. When additional brazing material 18 is used to fill in the seam, enough is first added to form a slight mound or bead, this bead being then trimmed smooth so that the braze-fill is flush with the cylindrical adjoining surfaces of the shell parts.

It will be evident that the annular flange formed by the united abutting flanges 16, 17 greatly strengthens the cylindrical portion of the float.

The float is here shown as provided with means 19 for connecting it to a rod or lever for operating a valve or other device to be controlled (not shown). The means 19 is here shown as a metallic lug which may have a hexagonal body 20 provided with a cylindrical shank 21. The body 20 may be provided with a threaded recess 22 into which the threaded end of a rod (not shown) may be screwed. The shank 21 is here shown as projecting into the float through an aperture 23 in the hemispherical end 14 of the shell part 10. Desirably but not necessarily the surface of the shoulder 24, of the body 20, adjacent the shank is dished to conform to the adjacent spherical surface 14 of the shell part 10. The lug 19 may be united to the shell part 10 by brazing sweated in between the engaging surfaces of the shell and lug.

The entire outer surface of the float structure as hereinbefore described is provided, as by electroplating or in any other suitable way, with a coating 25 of copper or other suitable corrosion-resisting material capable of withstanding relatively high temperatures under corrosive conditions.

If desired strengthening means 26 may be provided, this means extending within the float from the inside wall of the hemispherical end 15 of the shell part 11 to the inside wall of the hemispherical end 14 of the shell part 10. The strengthening means 26 comprises a tubular member 27, desirably of steel and of an internal diameter so that it fits at one end around the shank 21, and desirably abuts the inside of the hemispherical wall 14. The other end of the tubular member 27 may be suitably fastened to the inside wall of the hemispherical end 15 of the shell part 11. In this instance a metal washer 28, which may be dished to conform to the wall 15, is interposed between said wall and the end of the tubular member. The tubular member 27 and the washer 28 are here shown as fastened together by means 29 such as a weld, brazing material, or other suitable means. As here shown a hole 30 has been drilled through the shell part 11 and the washer 28, and brazing material 31 has then been run into this hole to fill and seal the hole and at the same time fasten the washer 28 to the shell part 11. It will be evident that the means 26 strengthens the float and in particular prevents the shell portions adjacent the lug 19 from being dented inwardly or otherwise bent by forces tending to change the relative direction of the axis of the lug with respect to the float.

The hole 30 is filled in with brazing material after the joint 32 has been brazed, as the brazing of the joint heats the air within the float, and one of the purposes of the hole through the shell is to permit the escape of the heated expanded air. Preferably the hole 30 is sealed while the float is still hot. If desired a small hole 35 may be provided in the tubular member 27 to insure easy escape of air from within the float and tubular member to and out of the hole 30 in the shell part. Escape of air may be provided for in other ways and the strengthening means 26 may assume other forms, one of which will be described in connection with the embodiment of Figure 4.

The float illustrated in Figure 4 comprises two shell parts 10a, 11b both of which are here shown as hemispherical. The shell parts are united by a joint 32a. The joint 32a comprises an inwardly offset flange 36 on one of the shell parts, the flange 36 being joined to the shell part 10a by beading 37, and being offset by an amount preferably equal to the thickness of the shell parts, so that the margin of the other shell part 11b may be telescoped over the flange 36 and pushed into abutment with the beading 37. The engaging portions of the joint 32a are united by brazing.

In Figure 4 the shell part 10a is shown as provided with an aperture 38 margined by flange means 39 provided by material which before formation of the aperture occupied the area of the aperture, the flange means 39 being formed by bending said material inwardly. The aperture 38 and flange means 39 are formed in one operation as illustrated in enlarged Figures 5 and 6. In these figures a die 40 is fragmentarily shown, this die having a cylindrical aperture 41 preferably having a rounded margin 42. The die 40 and shell part 10a are brought into engagement as shown in Figure 5 and then a pierce punch 43 having a cylindrical portion 44 and a conical point 45 is driven against the shell part 10a, the punch 43 forming the aperture 38 and bending the material to form the flange means 39 as the punch enters the aperture 41 in the die. The completed aperture 38 and flange means 39 are shown, in section, in Figure 6 after the punch 43 has been withdrawn. The punch 43 does not remove any metal but as the point of the punch enters the shell it eventually tears the metal, usually at three lines radiating outwardly from the point of the punch, meanwhile bending the metal against the inside surface of the aperture 41 of the die. By not removing any metal a longer and better flange means 39 is provided.

The float is provided with a lug 19a here shown as similar to the lug 19 shown in Figure 1, the shank 21a of the lug extending through the aperture 38 and fitting in the inside of the flange means. Sweat brazing unites the mutually engaging surfaces of the lug, the shell, and the flange means.

Strengthening means 26a, analogous to the strengthening means 26 described in connection with Figure 1, may be provided. In the instance shown in Figure 4 a tubular member 27a is illustrated as of sufficient inside diameter to fit around the flange means 39 and this end of the tubular member is shown as abutting the inside surface of the shell part 10a. The other end of the tubular member 27a is shown as united to a washer 28a in the manner described in connection with the tubular member 27 and washer 28 of Figure 1, but in Figure 4 the washer 28a is shown as fastened to the inside wall of the shell part 11b as by brazing material 46. It will of course be apparent that in this embodiment the tubular member 27a, if fastened at all to the shell part 11b, must be fastened, through intermediation of the washer 28a, to the shell part 11b, before the shell parts are assembled as shown. As shown in Figure 4 an aperture 47 for permitting escape of air is provided at any desired place in the float shell and this aperture is then sealed by brazing 48.

From the foregoing it will be apparent that the strengthening means 26a shown in Figure 4 and the manner in which it is related to the other elements and the manner in which escape of air is provided for may be changed to embody the construction and arrangement shown and described in connection with Figure 1, and vice versa.

The parts hereinbefore described in connection with Figure 4 having been assembled and the various joints brazed, and the float sealed at 48, the float is given a coating 25a of corrosion-resisting metal as hereinbefore described in connection with the coating 25 in Figure 1.

The joint 32a is shown in section much enlarged and more or less diagrammatically, in two forms in Figures 7 and 8 respectively. In Figure 7 the overlapping telescoped portions of the joint 32a are united by sweat-braze 49, and then brazing material 50 is filled into the seam sufficient to form a slight outward bead, then smoothed off flush with the outer surfaces of the shell parts 10a, 11b, and then the corrosion-resisting metal coating 25a is applied. In Figure 8 the overlapping telescoped portions of a joint 32b similar to the joint 32a, are united by sweat brazing 49a, but the seam is not braze-filled, and the float is then provided with a coating 25b of corrosion-resisting metal, whereby, of course, the seam 51 of the joint will be visible.

It will be evident that if desired a joint of the form of the joint 32 of Figure 1 may be used in a spherical type of float as shown in Figure 4 and on the other hand a joint such as the joint 32a of Figure 4 may be used in a float of the type shown in Figure 1. Any of these joints may be of the smooth seamless appearing kind or of the type in which the seam shows. In general, the features of the float shown in Figure 4 are not limited to the spherical type nor are the features of the float shown in Figure 1 limited to the type there shown.

By getting rid of a large proportion of the air within the float, oxydation of the inside of the float is negligible.

A float embodying the invention, with or without the strengthening means such as 26 or 26a, is particularly adapted for use in connection with steam boilers and apparatus where the steam may have a temperature up to the order of 500° F. to 800° F. or higher. Of course a float embodying the invention may be used to advantage where conditions are less severe. A float for use with the higher steam temperatures is not only subjected to very high temperature but to accompanying high steam pressures. The material which unites the joints in the float must be able to withstand the temperature of the steam, and the joints and the float as a whole must be able to withstand the accompanying pressure. Furthermore, the float must be adequately corrosion resistant, failure due to corrosion being more apt to occur at high temperature and pressure. The float is not only subjected to high temperature but between the upper portion of the float and the lower portion thereof there exists a high temperature differential because the lower portion of the float is immersed in steam condensate and the upper portion thereof is exposed to steam at a much higher temperature. This puts a great strain on the joint between the shell parts of the float tending to burst it.

A spherical float adapted for the services hereinbefore described may be of a diameter approximately of the order of two to twelve inches and a float of the type shown in Figure 1 may be approximately the same diameter order and having a length of approximately the order of six or more inches. These figures, however, are given merely by way of illustration and not limitation. In connection with these sizes the thickness of the shell parts may be as follows: By way of illustration and not limitation, the thickness of the steel of which the shell parts may be made, may be of the order of about fifteen thousandths (.015) of an inch to about fifty thousandths (.050) of an inch and the copper coating preferably is of a thickness of the order of about five thousandths (.005) of an inch to about twenty-five thousandths (.025) of an inch. The order of thickness of copper coating is substantially greater than the minimum thickness of copper coating which might be feasible under less severe conditions. Such a minimum thickness is approximately three ten thousandths (.0003) of an inch. A shell made of steel of sufficient thickness to provide the required strength and coated with copper of minimum thickness is not feasible for use under the more severe conditions, because, for one reason, the copper coating tends to peel, scale or blister, or otherwise become loosened from the steel. Also, too thin a coating may not be sufficiently corrosion resistant because of possible porosity. On the other hand a float comprising a shell of steel coated with copper of materially greater thickness than the minimum not only does not have the foregoing disadvantages but the composite shell is strengthened by the copper coating so that the steel and copper cooperate to provide a very strong, light float which at the same time has substantially the corrosion-resisting qualities of an all copper float. A float in accordance with the invention does not have the disadvantages of an all copper float such as, among other things, the fact that an all copper float, if it could be made of sufficient strength to withstand the higher steam pressures, would be too heavy. An all copper float of sufficient strength cannot be feasibly made because the copper is softened and weakened by the heat necessary for the application of brazing or like materials having a sufficiently high fusion or failure temperature to withstand the temperature of the steam. An all copper float not only lacks the requisite strength but lacks the requisite buoyancy required of a float of feasible size.

In general, the thickness of the steel and copper are chosen so that the float will have the requisite strength. Accordingly, for a float larger than twelve inches to withstand the same conditions as a twelve inch float, the steel and copper will be made of greater thickness. I have found that, in general, a satisfactory ratio between the thickness of the copper coating and the thickness of the steel of the shell is of the order of approximately a ratio of one to three, to a ratio of one to two, that is the copper coating is of the order of about one-fourth to one-third of the composite thickness of the float shell.

For uniting the joints hereinbefore described the brazing material should have a fusion temperature in general above 1000° F., and for the more severe conditions a fusion temperature of the order of about 1300° F. or more is preferred. So-called silver solders or other materials which are applied and used in the manner of brazing materials may be used provided the fusion temperature is in the desired range and provided the failure temperature thereof is sufficiently above the temperature of the stem. It may be noted that a material might have a high enough fusion temperature and yet its eutectic point might be so low that the material would fail when subjected to the combination of high pressure and the relative high temperature steam though the steam is at a temperature lower than the fusion temperature of the material. It will be understood of course that brazing materials and materials applied and used in the manner of brazing materials are alloys.

In general, material used for uniting the joint between the float shell parts and the joint between the lug and the float shell should satisfy the conditions hereinbefore mentioned and should be non-ferrous. The material used to seal an air vent (such as 30) should also be non-ferrous. The corrosion resistant coating material should also be non-ferrous. The lug (such as the lug 19) should be of non-ferrous material such as brass, copper, or other non-ferrous material. It may be noted that the threaded recess (22) in the lug cannot feasibly be coated with copper or other corrosion resistant material. Desirably the rod which is to be screwed into the recess 22 is of brass or other non-ferrous material and if screwed into a lug of steel or other ferrous material, corrosive electrolytic action will result due to the action of the steam or condensate or both. It will be evident that a float satisfying the requirements hereinbefore mentioned has no part of ferrous material which is exposed to steam or condensate, the entire surface being non-ferrous. In general, a float made in accordance with the invention eliminates corrosive action due to electrolysis.

The term ferrous is used for the sake of brevity to designate iron or iron-containing material, and the term non-ferrous to designate material containing no iron or at most only in a negligible amount such as would not affect the material for the purpose herein set forth.

From the foregoing it will be apparent to those skilled in the art that each of the illustrated embodiments of my invention provides a new and improved float or the like and accordingly, each accomplishes the principal object of my invention. On the other hand, it also will be obvious to those skilled in the art that the illustrated embodiments of my invention may be variously changed and modified, or features thereof, singly or collectively, embodied in other combinations than those illustrated, without departing from the spirit of my invention, or sacrificing all of the advantages thereof, and that accordingly, the disclosure herein is illustrative only, and my invention is not limited thereto.

I claim:

1. A hollow float, comprising: steel shell parts having mutually engaging joint portions; metallic bonding material adhering to and uniting said joint portions, the fusion temperature of said bonding material being substantially below the fusion temperature of said steel and higher than approximately 1000° F., and said bonding material having been fused in place at a temperature substantially below the fusion temperature of said steel; and at least the external surfaces of said shell parts and said bonding material having a coating of corrosion-resisting metallic material deposited thereon, the relative thickness of said corrosion-resisting material and said steel being a ratio of approximately one to three to a ratio of approximately one to two.

2. A hollow metallic float, comprising: shell parts joined to each other intermediate the opposite ends of said shell parts; one of said ends having an aperture margined by an inwardly directed flange; a lug member having a portion disposed in and fastened in said flange; strengthening means abutting the inside wall of the other of said ends and including a tubular member extending within said shell parts to and abutting the inside wall of said one of said ends, said tubular member having its inside surface fitting telescopically on the peripheral surface of said flange.

3. A hollow float having a minimum diameter in a range from approximately two inches to at least twelve inches and suitable for use in steam condensate and steam at temperatures up to the approximate order of at least 500° F., comprising: drawn sheet steel shell parts having a thickness in a range from approximately fifteen thousandths of an inch to at least fifty thousandths of an inch, and having mutually engaging joint portions; non-ferrous brazing alloy adhering to and uniting said joint portions, the fusion temperature of said brazing alloy being substantially below the fusion temperature of said steel and higher than approximately 1000° F., and said brazing alloy having been fused in place at a temperature below a temperature which would substantially weaken said steel; and at least the external surfaces of said shell parts and said brazing alloy having a coating of copper deposited thereon, the relative thickness of said copper and said steel being a ratio of approximately one to three to a ratio of approximately one to two.

4. A hollow float, comprising: shell parts of steel having mutually engaging joint portions; means, including a lug of non-ferrous metallic material, having a recess constructed and arranged for connection to an operating means, said lug and one of said shell parts having mutually engaging joint portions; metallic bonding material adhering to and uniting said respective joint portions, said bonding material being a non-ferrous brazing alloy the fusion temperature of which is substantially below the fusion temperature of said shell parts and said lug respectively and higher than approximately 1000° F., and said brazing alloy having been fused in place at a temperature substantially below the fusion temperature of said shell parts and said lug respectively; and at least the external surfaces of said shell parts and said bonding material having a coating of corrosion-resisting metallic material deposited thereon, the relative thickness of said corrosion-resisting metallic material and said steel being a ratio of approximately one to three to a ratio of approximately one to two.

SYDNEY M. HODGINS.

REFERENCES CITED

The following references are of record in the file of this patent:

UNITED STATES PATENTS

| Number | Name | Date |
| --- | --- | --- |
| 14,959 | Hoyt | May 27, 1856 |
| 274,833 | Shepardson | Mar. 27, 1883 |
| 740,625 | Burlingame | Oct. 6, 1903 |
| 789,342 | Voelke | May 9, 1905 |
| 831,639 | Waldo | Sept. 25, 1906 |
| 855,659 | O'Brien | June 4, 1907 |
| 944,477 | Briggs | Dec. 28, 1909 |
| 1,046,162 | Engelhard | Dec. 3, 1912 |
| 1,287,442 | Rosenthal | Dec. 10, 1918 |
| 1,587,404 | Nicholson | June 1, 1926 |
| 1,829,828 | Gay | Nov. 3, 1931 |
| 1,992,605 | Clifford | Feb. 26, 1935 |
| 2,004,182 | Arey | June 11, 1935 |
| 2,079,126 | Maas | May 4, 1937 |
| 2,087,913 | Kenney | July 27, 1937 |
| 2,166,109 | Karmazin | July 18, 1939 |
| 2,320,163 | Anderson | May 25, 1943 |
| 2,327,299 | Yablin | Aug. 17, 1943 |

FOREIGN PATENTS

| Number | Country | Date |
| --- | --- | --- |
| 22,776 | Great Britain | Oct. 15, 1906 |
| 24,188 | Great Britain | Nov. 23, 1905 |
| 583,727 | France | Nov. 5, 1924 |